Patented June 9, 1942

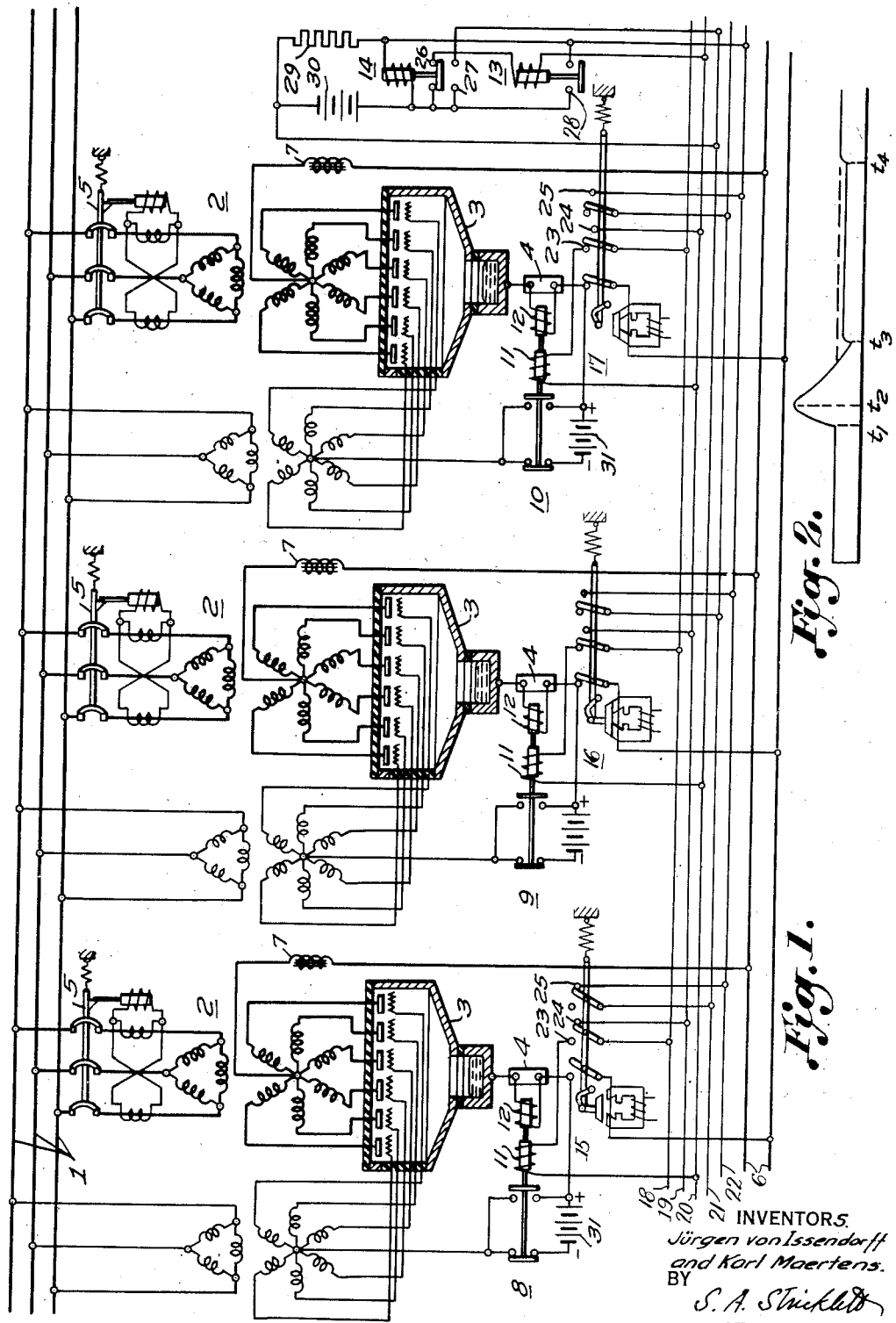

2,285,634

UNITED STATES PATENT OFFICE 2,285,634

CONVERSION SYSTEM

Jürgen von Issendorff and Karl Maertens, Berlin-Siemensstadt, Germany, assignors to Westinghouse Electric & Manufacturing Company, East Pittsburgh, Pa., a corporation of Pennsylvania Application December 19, 1939, Serial No. 310,006
In Germany December 10, 1938

9 Claims. (Cl. 175—363)

Our invention relates to a conversion system and particularly to a protective device for such a system.

For rectifier plants of substantial size with two or more parallel units, different protective circuits have been proposed to render the effect of backfire as far as possible harmless. In particular, high speed circuit breakers in the D. C. circuit or high speed relays in the grid circuits have been used for interrupting the short circuit currents which arise. For example, an arrangement has been provided in which all of the rectifiers are blocked for a certain time in case of a disturbance by means of the grids; however, the rectifiers which are not defective are not blocked so long as those in which the backfire is taking place. Here there is only one sequence which may be maintained by a switchboard attendant by hand actuation without special consideration because he always carries out control measurements at the faulty rectifier before reclosure.

The reactions on the feeding network are of particular significance for a high current plant with many parallel operating rectifiers; since the rectifier loading often represents a considerable portion of the total loading of this network. Abrupt variations or even complete disconnection of the whole load will always have a harmful effect on the maintenance of potential as well as on the stability of the feeding generators.

In accordance with our invention, the blocking potential, which is usually automatically applied to the grids of all rectifiers which are drawn into sympathetic operation in the event of an arcback, is maintained connected in only for a time as long as the disconnecting time for the overcurrent in the faulty rectifier. After the extinction of the short circuit current loading of the network, the normal utilization load at approximately full value is accordingly re-established at once. Thereby a complete unloading of the network is avoided or is limited to a fraction of a period. It is advantageous to set the time sequence of the mechanical or ionic relays necessary for this purpose in such manner that the load fluctuations in the polyphase network and the phenomena associated therewith such as the blinking of the lights of the lamps connected to the circuit become a minimum.

The carrying out of these measures is not dependent alone on the grid circuits, but there are interconnections with circuit arrangements on the D. C. side as well as on the polyphase side of the rectifier plant which are applicable with advantage. For example, the unblocking of the grids may be made dependent on the position of a back current switch in the D. C. circuit and an A. C. switch in the feeding conductor. The short circuit power is considerably decreased at the time that the D. C. back current switch drops out; it is at the latest interrupted finally by the A. C. switch. Therefore, it is at least possible, by using front and back contacts on these switches, to establish the characteristics of the plant and the extinction properties of the rectifier in a manner corresponding to the release of the grid so that there is a minimum of load fluctuation. Corresponding operation is also attainable with the aid of additional relays which are influenced by the over-current or a potential which changes in the case of a fault and raise the blocking only at the interruption of this influence. Often it will be preferable to time the release of the grid with adjustable delay devices of mechanical or electrical type (reservoir means) in such manner that the unfaulty rectifiers do not deliver current before the separation of the faulty rectifiers from the D. C. circuit, but always before the current flowing between the anodes of the faulty rectifiers is completely interrupted. In this manner, the current fluctuations of the feeding network are decreased to a minimum.

The rectifier in which the backfire occurs need not be unconditionally automatically connected in again to fulfill the problem with which we are confronted; this may also take place by hand, if, for example, the vacuum control is carried out. Therefore, a locking of the faulty rectifier is sufficient sometimes in dependence upon cathode back current which prevents the release of the grids or the connecting in again of the associated circuit interrupters.

It is, accordingly, an object of our invention to provide a system in which faults will be interrupted with a minimum of reaction on the feeding network.

It is a further object of our invention to provide a multiple unit conversion system in which a faulty unit is isolated and the non-faulty units assume load before interruption of the faulty current.

Other objects and advantages will be apparent from the following specification taken in conjunction with the accompanying drawing, in which Figure 1 is a schematic illustration of a conversion system according to our invention, and Fig. 2 is a graphical illustration of the current conditions in our converter system.

In Fig. 1, an exemplary embodiment of the invention is illustrated. The transformers 2 are connected to the polyphase network 1 through power circuit breakers 5. The secondary phase potentials are supplied to the rectifiers 3. In the D. C. circuit of the latter, there are in series the shunt impedance 4, the back current switches 15, 16, 17, the D. C. network 6 and the smoothing chokes 7. The rectifiers operating in parallel which may be selected at any number are here elected to be 3. The quick acting relays 8, 9 and 10 and the batteries 31 serve for impressing on the rectifier grids a negative blocking potential with reference to the cathode. The release of the relays 8—10 is effected by the windings 12 connected to the shunt 4. The windings 11 which may be excited from the battery 30 serve for return of the relays, that is to release the grids. The back current is interrupted by the cooperation of relays 13 and 14.

The operation of the protective device as a consequence of backfire is as follows: Assume an arc-back to occur in any section such, for example, on the left-hand section of Fig. 1. Then the arc-back in the left-hand section produces a short circuit on the D. C. line 6 so that all the remaining sections are momentarily overloaded. The over current in the impedances 4 energizes the coils 12 so that the quick acting relays 8, 9, and 10 pick up as shown in Fig. 1. Simultaneously the reverse current switch 15 drops out removing the faulty section and clearing the short circuit on the line 6. The reverse current switch 15 on opening closes its back contacts 24 and 25. Closing the back contact 24 connects the conductor 18 with the conductor 19. The reversing conductor 19 is connected through the relay 13 and the front contact 26 of the relay 14 with the battery 30, the other terminal of which is connected to the reversing conductor 20. The two reversing conductors 18 and 20 now form a D. C. conducting bar which supplies current for returning the quick relays by means of the winding 11, assuming that the front contacts 23 in series with them are closed. In Fig. 1, the operating contacts 23 are only closed for the switches 16 and 17 so that, accordingly, only the quick acting relays 9 and 10 of the unfaulty rectifiers are returned and these again take up their normal current supply to the collecting bars 6. The return current also actuates the relay 13, which, under certain circumstances, with a small delay, closes its front contacts 28 after the return process of the quick relays 8—10 has been completed. Thereby the winding of relay 14 which heretofore was excited through the resistor 29 from the battery 30 is short circuited. The relay 14 consequently drops out and closes its back contacts 27 which are also connected in parallel to its windings albeit with the reversing conductor 21 connected in series. Finally, these two reversing conductors are connected to each other through the back contact 25 of the dropped out switch 15, thus the relay 14 is held in its rest position. Its interrupted front contacts 26 prevent another return, i. e., in case of another backfire arising for the rectifiers which have been connected in again whereby the quick acting relays would operate a second time, the whole plant would remain blocked.

The operator need now concern himself only with the switch 15 and the quick relay 8 of the backfiring rectifier. After a sufficient time interval, the switch 15 is again closed opening back contacts 24 and 25 and the quick relay 8 is returned. Both measures may take place by hand actuation or may be automatic and with an adjustable delay or dependent on operating magnitudes, for example, the vacuum indicators, temperature or the like of the associated rectifier. The normal operating condition is, in this way, again established; for by the interruption of the back contacts 25 on switch 15, the connection of the reversing conductors 21 and 22 is lifted and the short circuiting of the winding of relay 14 is suppressed so that it pulls up and by closing its front contact 26 brings the return circuit again into operating condition. Finally, by closing the switch 15, the back contact 24 which has initiated the operation of the above-described protective device is interrupted.

After the dropping out of the switch 15, the backfire of the associated rectifier 3 is immediately extinguished by grid-blocking, since the back current from the bus bar 6 is interrupted. Therefore, the feeding network 1 is again loaded without interruption by the immediate return of the quick relays 9 and 10. If it happens, however, that as a consequence of high temperature of the anodes, the backfire extends to a plurality of anodes, and is not extinguished, then the associated power circuit breaker 5 must operate. In accordance with the invention, a corresponding back contact of the power circuit breaker switch may also, for such a case, be selected in lieu of the back contacts 24 of the quick switches 15, 16 and 17 for the connection of the reversing conductors 18 and 19, or a series circuit of the back contacts of the switches which are associated with one and the same rectifier may be used. Finally, intermediate relays with adjustable delay may also be provided and they may effect the return of the quick relays after a time selected to correspond to the extinguishing of the backfires by the switches present. Finally, we may start with the instantaneous value of the current in the faulty rectifier and in such a case, the return of the quick relay takes place only when the faulty rectifier or its transformer carries current under a definite limiting value. With advantage, ionic relays may be used in such a case.

With advantage, the automatic switching in accordance with the invention may be completed by regulating devices which maintain constant a definite potential or a definite current strength in the rectifier in normal operation, and after the falling out of one or more rectifiers, at once effect a decrease. For example, the total current strength may be held constant and after the falling away of the faulty rectifier, the whole regulator may be influenced with the aid of relays in such manner that it controls down to a decreased current strength which is normal for the rectifiers remaining in operation. This reaction may be obtained by interrupting of shunts to the current coils of the regulator without further complications. It is also advantageous to control each rectifier by an individual regulator to constant current because in such a case, the separate influencing of the regulation on the falling out of a part of the rectifier becomes superfluous.

In Fig. 2, the course of the current strength as a function of time in a primary phase of a plant protected in accordance with the invention is illustrated diagrammatically. Up until the time $t_1$, the normal network current flows to the rectifier. It is assumed that at $t_1$, an arc-back arises and the current rises considerably. At $t_2$, the grid blocking devices may operate and the current decreases. At $t_3$, accordingly, shortly before and, under certain circumstances, also shortly after the complete discontinuance of the current in the faulty rectifier, the grid blocking is lifted in the non-faulting sections and a decreased current flows from $t_3$ to $t_4$ when all the rectifiers are put in operation. It will be recognized from this that in the power supply (steam consumption) of a power generator, no appreciable interruption is introduced.

We claim as our invention:

1. Protective device for current rectifier plants, comprising a plurality of parallel operating mercury vapor rectifiers, grid control means for each of said rectifiers, a source of blocking potential for each of said control means, means responsive to arc back in any of said rectifiers for applying said blocking potentials to all of said control means, an arc back responsive disconnecting means in series with each of said rectifiers, and means responsive to the opening of the disconnecting means of the rectifier undergoing arc back for removing the blocking potential from the control means of the remaining rectifiers.

2. Protective device according to claim 1, characterized by the fact that the grid blocking of all the rectifiers is so dimensioned as regards the length of time during which it is applied that a minimum of load current fluctuation arises in the feeding alternating current network.

3. Protective device according to claim 1, characterized by the fact that the blocking of all of the rectifiers sets in instantaneously at the beginning of the short circuit and is maintained until the rectifier which is backfiring is disconnected from the feeding network as well as from the supplied network.

4. Protective device according to claim 1, characterized by the fact that the blocking time is determined by influencing the grid control potential by means of a relay combination or by electrical reservoir means of adjustable characteristic time.

5. Protective device according to claim 1, characterized by the fact that the blocking potential is impressed on the control grids of all the parallel rectifiers without delay as long as any of the rectifiers carries an overcurrent.

6. Protective device according to claim 1, characterized by the fact that the removal of the blocking potential is effected by auxiliary contacts of the mechanical switch which disconnects the backfiring rectifiers.

7. Protective device according to claim 1, characterized by the fact that the repetition of a backfire before the first backfiring rectifier is again connected in locks the repeated release of the grid blocking and renders the blocking final.

8. An electric conversion system comprising a plurality of parallel operating arc type converters, grid control devices for each of said converters, a high speed reverse current switching device in series with each of said converters, an overcurrent relay in series with each of said converters, a source of blocking potential for each of said converters, switching means actuated by said overcurrent relays for applying said blocking potential to said grid control devices and means responsive to the opening of the reverse current switching device of the faulty converter for removing the blocking potential from the non-faulty converters.

9. An electric conversion system comprising a plurality of parallel operating arc type converters, grid control devices for each of said converters, a high speed reverse current switching device in series with each of said converters, an overcurrent relay in series with each of said converters, a source of blocking potential for each of said converters, switching means actuated by said overcurrent relays for applying said blocking potential to said grid control devices and means responsive to the opening of the reverse current switching device of the faulty converter for removing the blocking potential from the non-faulty converters and means responsive to a second fault for locking out the conversion system.

JÜRGEN von ISSENDORFF.
KARL MAERTENS.